3,291,509
FLANGED JOINT
Finn Börsum, Degerfors, Tage V. Jansson, Bromma, and Carl Åke Moberg, Trollbacken, Sweden, assignors to Aktiebolaget Atomenergi, Stockholm, Sweden, a company of Sweden
Filed Mar. 30, 1964, Ser. No. 357,012
1 Claim. (Cl. 285—187)

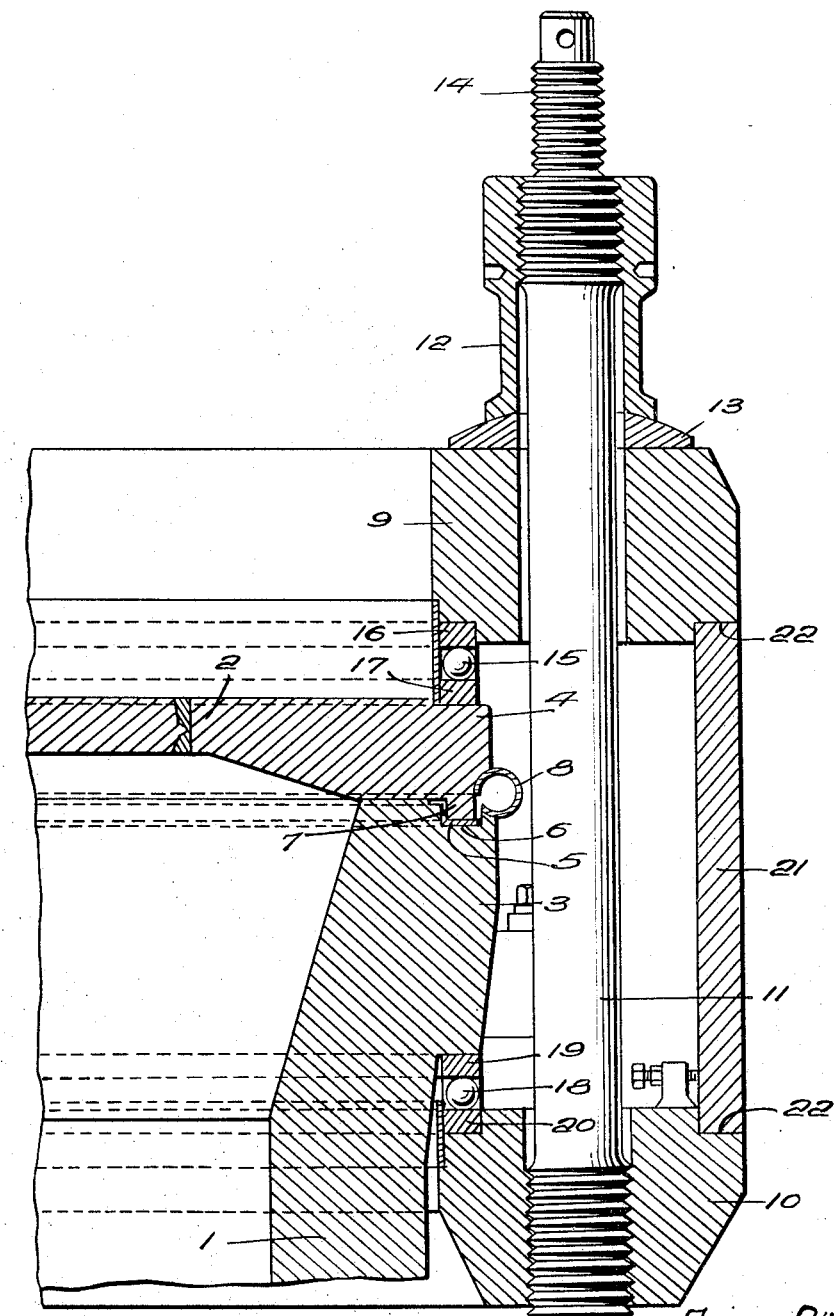

The invention relates to a flanged joint, particularly a flanged joint for high pressure vessels. It is a particular object of the invention to provide a flanged joint for joining the lid to the vessel of a nuclear reactor tank. Such a reactor tank is subjected to a high internal pressure, and is also subjected to additional stresses on such occasions when the temperature is not homogeneous throughout the reactor, for instance during start and shut off of the reactor.

The following specification will be entirely concerned with a flanged joint of a pressure vessel of a nuclear reactor, but this is not to be understood as a limitation of the invention.

In a nuclear reactor in which the pressure vessel has a lid which is secured to the vessel by means of a flanged joint the inhomogeneous temperature referred to above will produce movements or displacements in the radial direction between various parts of the joint. If said movements or displacements were not allowed to take place, said inhomogeneous temperature would result in undesired stresses which might jeopardize the safe operation of the nuclear reactor. Therefore, it is the main object of the invention to provide a flanged joint in which such movements can take place freely.

Flanged joints are known which have allowed some degree of radial movement. Said radial movement, however, has taken place with a certain amount of friction and, consequently, the movement has not been entirely free, which is the main object of the present invention.

The flanged joint of the invention comprises two flanges, two ring-shaped members engaging said flanges, and a plurality of bolts for pressing said ring-shaped members together with said flanges against each other, and is characterized in rollers being provided between the flanges and the ring-shaped members so as to allow a radial movement without friction between each flange and the ring-shaped member engaging said flange. In one embodiment of the invention the ring-shaped members consist of several sections, each section extending along a portion of the circumference of the flanges. In another embodiment of the invention there is provided a collar-shaped member between the two ring-shaped members, outside the bolts. Said collar-shaped member prevents any bending of the ring-shaped members, thus making it possible to reduce their thickness. The invention is illustrated in the accompanying drawing in which the single figure is a partial vertical section through the pressure vessel and its lid and the flanged joint.

The drawing illustrates a portion of the wall 1 of a pressure vessel of a nuclear reactor, and a portion of the lid 2 of the pressure vessel. The pressure vessel has a circular flange 3 containing a recessed portion 6. The lid has a circular flange 4 provided with a protruding portion 7 engaging the recessed portion 6 which contains a sealing ring 5 or the like. There is also provided an auxiliary sealing member, viz a slit tube 8 having one edge welded to flange 3 and the other edge welded to flange 4. Both sealing members 6–7 and 8 allow some radial movement between the pressure vessel 1 and its lid 2.

The flanges 3 and 4 are pressed towards each other by two ring-shaped members 9 and 10 extending around the pressure vessel. The ring-shaped members 9 and 10 contain holes for bolts 11. Each bolt is secured by a thread to the lower ring-shaped member 10 and engages the upper ring-shaped member by means of a nut 12 and a washer 13. The bolt has a threaded head 14 which can be fastened to a hydraulic apparatus for pre-stressing the bolt to the desired degree.

A plurality of cylindrical rollers 15 are provided between the flange 4 and the upper ring-shaped member 9. The rollers 15 engage with ring-shaped members 16 and 17 consisting of roller bearing steel. A plurality of similar roller bearing units 18, 19, 20 are provided between the flange 3 and the lower ring-shaped member 10. Each roller 15 has its axis extending perpendicularly to a line from the centre of the pressure vessel to the roller.

A collar-shaped support member 21, extending around the reactor, is arranged with its upper edge seated on the outer portion of the upper ring-shaped member 9, and with its lower edge seated on the outer portion of the lower ring-shaped member 10. The two edges 22 of the collar-shaped member 21 preferably are somewhat rounded.

In the illustrated device, a movement of one or both of the flanges 3, 4 will only produce a movement of the rollers 15, 18. Consequently, the only force which can be transferred from the flanges to the ring-shaped members 9, 10 is the force produced by the insignificant friction of the rollers on the members 16, 17, 19, 20. Temperature differences may produce a radial movement of one of the ring-shaped members 9, 10 relative to the other one. Such a radial movement will produce a bending of the bolts 11 and of the collar-shaped member 21. Therefore, the bolts 11 and the collar-shaped member 21 shall have such dimensions as to be able to bear such a bending. The stresses in the collar-shaped member 21 will be reduced by the edges 22 being rounded, as this will cause said edges 22 to roll on the ring-shaped members 9 and 10.

What we claim is:

A flanged joint comprising two opposed annular flanges, an annular recess in the inner face of one of said flanges, an annular sealing ring seated in said annular recess, an annular protruding portion of less radial width than the width of said recess extending from the inner face of the other of said flanges into said annular recess and engaging said annular sealing ring, an annular slit tube having its one edge secured to the edge of one of said flanges and its other edge secured to the edge of the other of said flanges externally of said annular recess and said annular protruding portion, whereby said opposed flanges may move relatively in a radial direction while maintaining fluid tight relationship, and clamping means comprising two ring-shaped members positioned on the opposite sides of the edge portions of said two flanges, rollers positioned between each of said annular ring-shaped members and the adjacent flange, a plurality of bolts extending through said ring-shaped members for drawing said ring-shaped members toward each other and into contact with said rollers and a collar shaped support member extending between said ring-shaped members externally of said bolts, said clamping means imposing an axial clamping force on said flanges while permitting relative radial movement thereof.

References Cited by the Examiner

UNITED STATES PATENTS

| | | | |
|---|---|---|---|
| 2,457,073 | 12/1948 | Stearns | 285—420 X |
| 2,689,753 | 9/1954 | Wechsler | 285—272 |
| 2,691,539 | 10/1954 | Milam | 285—368 X |
| 3,127,050 | 3/1964 | McDaniels | 220—46 X |

FOREIGN PATENTS 378,619   7/1964   Switzerland.

CARL W. TOMLIN, *Primary Examiner.*

T. A. LISLE, *Assistant Examiner.*